Sept. 30, 1969   R. AUZINS ET AL   3,469,716
SYSTEM FOR HANDLING CARGO LIGHTERS AND CARGO
HATCH COVERS ABOARD SHIP
Filed April 16, 1968   11 Sheets-Sheet 1
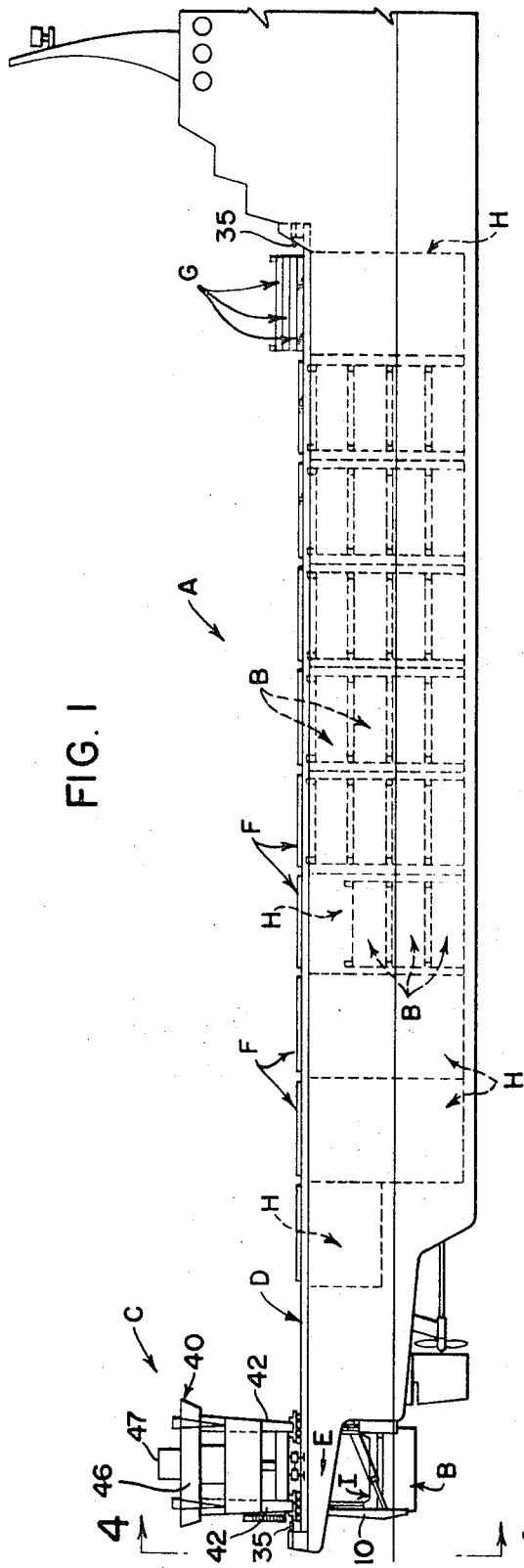
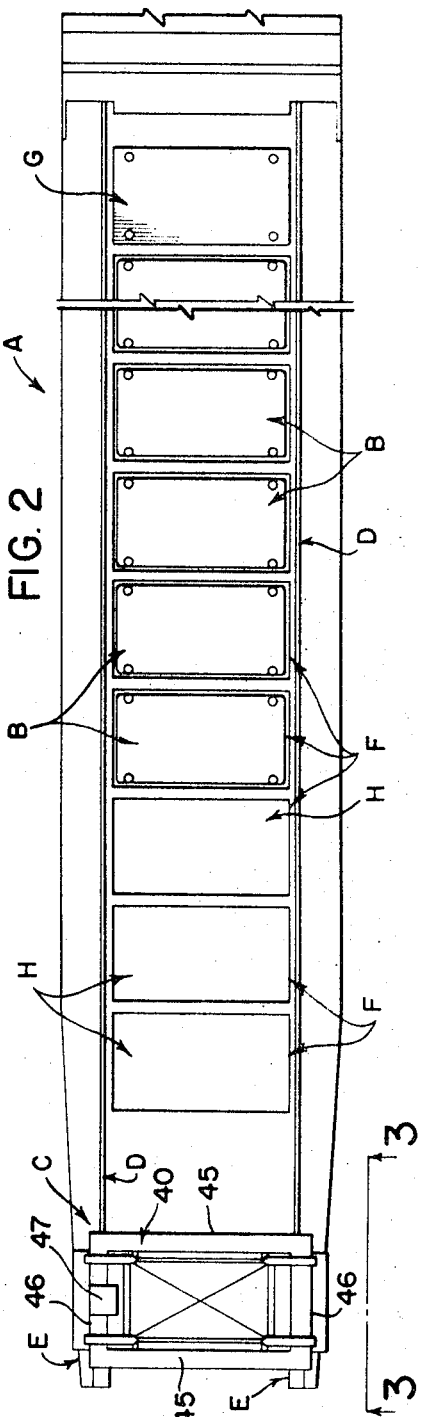
INVENTORS.
RAIMUNDS AUZINS,
EARL H. SIGMAN &
ALFRED SCHNEIDER
BY *Bosworth, Sessions,*
*Herrstrom & Cain*
ATTORNEYS INVENTORS.
RAIMUNDS AUZINS,
EARL H. SIGMAN &
BY ALFRED SCHNEIDER
Bosworth, Sessions,
Herrstrom & Cain
ATTORNEYS Sept. 30, 1969    R. AUZINS ET AL    3,469,716
SYSTEM FOR HANDLING CARGO LIGHTERS AND CARGO
HATCH COVERS ABOARD SHIP
Filed April 16, 1968    11 Sheets-Sheet 7
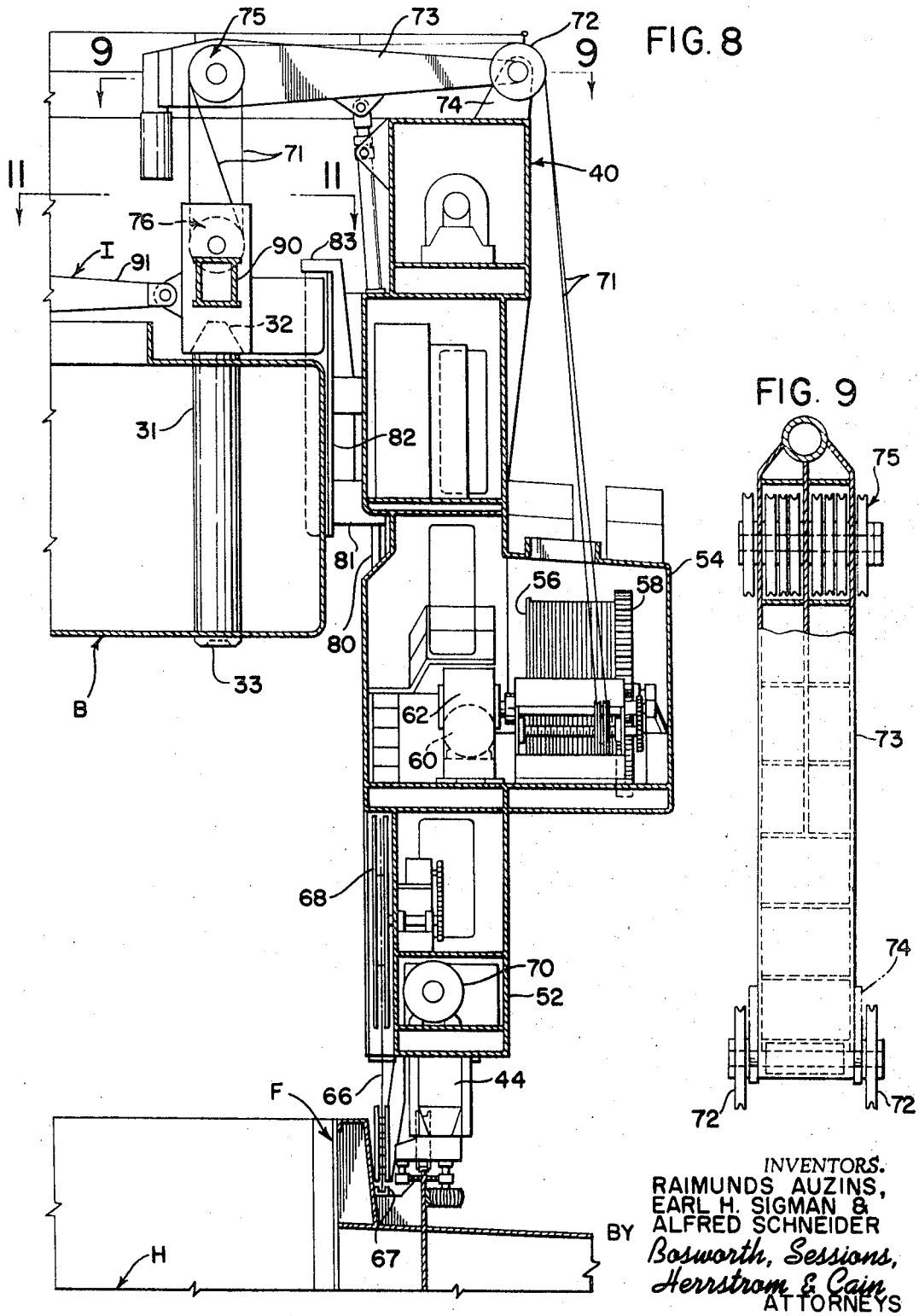
INVENTORS.
RAIMUNDS AUZINS,
EARL H. SIGMAN &
ALFRED SCHNEIDER
BY Bosworth, Sessions,
Herrstrom & Cain
ATTORNEYS

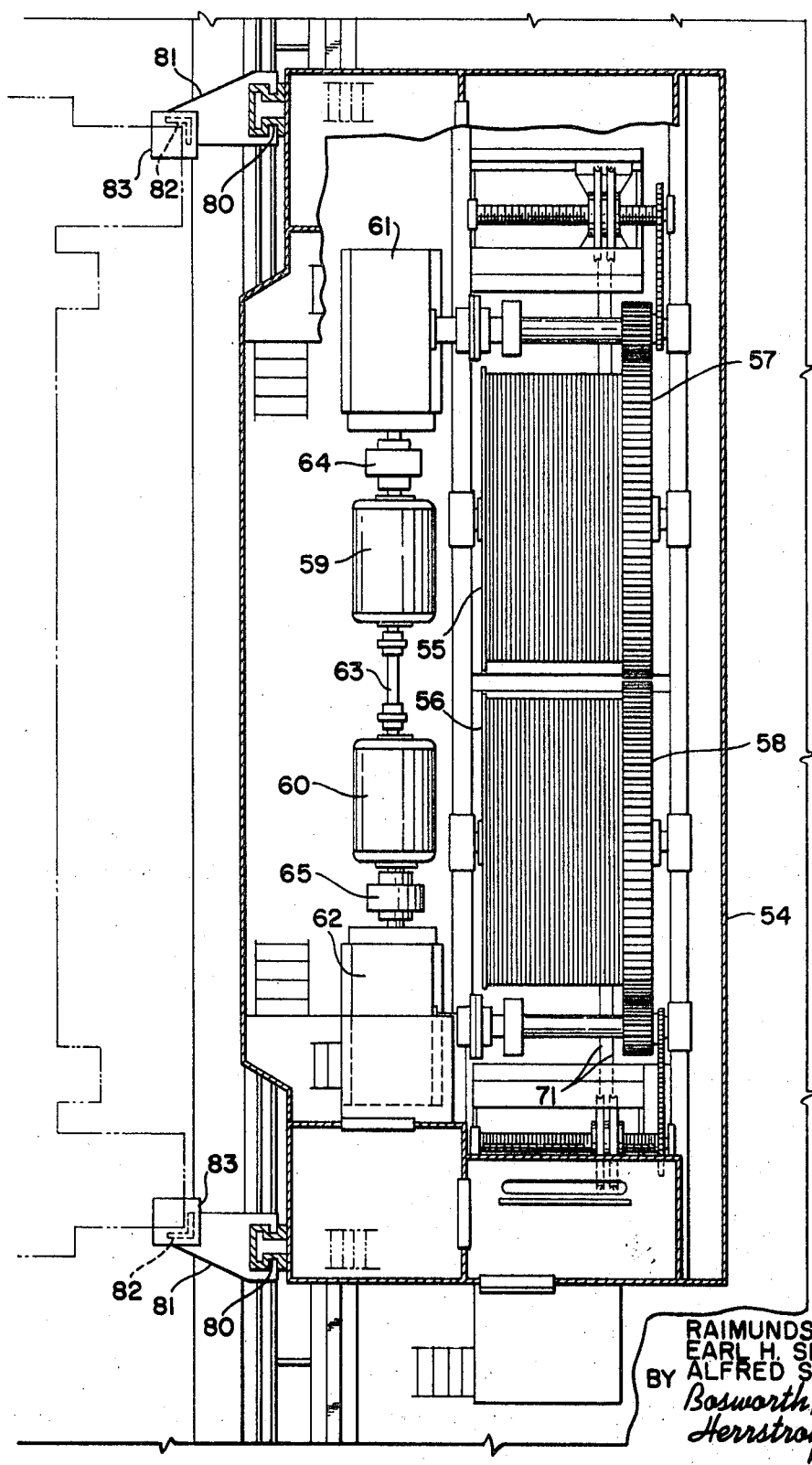

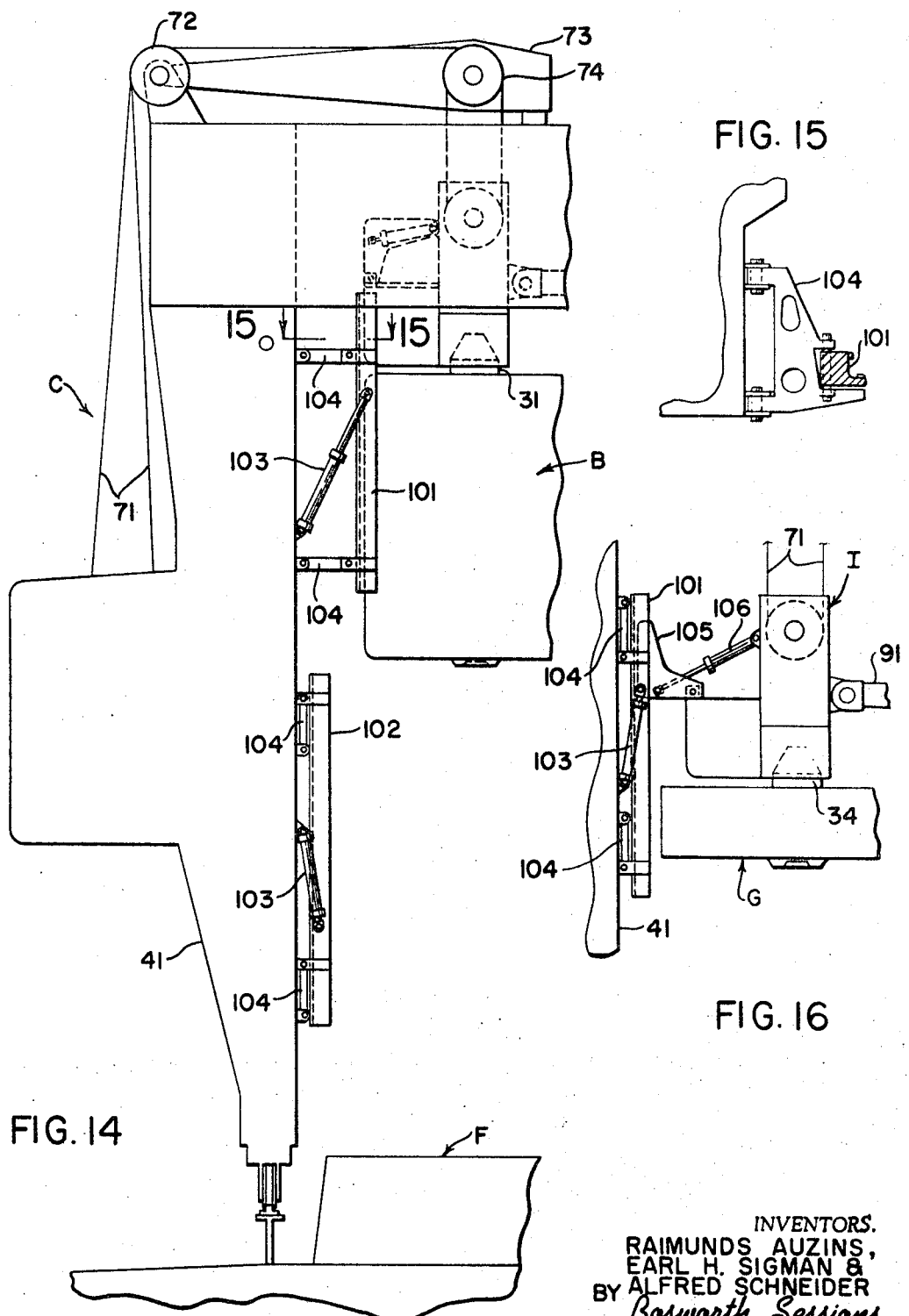

United States Patent Office 3,469,716
Patented Sept. 30, 1969

3,469,716
SYSTEM FOR HANDLING CARGO LIGHTERS AND CARGO HATCH COVERS ABOARD SHIP
Raimunds Auzins, Canton, and Earl H. Sigman, Alliance, Ohio, and Alfred Schneider, Bremen, Germany, assignors to United Industrial Syndicate, Inc., a corporation of New York
Filed Apr. 16, 1968, Ser. No. 721,821
Int. Cl. B63b 27/12
U.S. Cl. 214—15          5 Claims

ABSTRACT OF THE DISCLOSURE

A shipboard system for transporting, guiding and positioning lighters and cargo hatch covers during vertical and horizontal travel of the lighter between a floating position outboard of a ship and a storage location in the cargo hold of a ship and vertical and horizontal travel of a cargo hatch cover between a cargo hatch and a storage location, while the lighter or hatch cover are suspended by a hoist mechanism. The vertical and horizontal travel is accomplished by a shipboard gantry crane which travels longitudinally of a lighter carrying transport ship from a position on outboard cantilevers over a loading well at the stern of the ship, across the cargo holds with the gantry legs spanning the cargo hatches.

BACKGROUND OF THE INVENTION

This invention relates to a seagoing transport system wherein cargo is loaded on barges or lighters which are floated to a loading well at the stern of a ship at sea or at a dock and then lifted from the water and deposited in the cargo holds of the ship, one-on-top-of-the-other, by a traveling shipboard gantry crane located on the ship's deck. The lighters are subsequently unloaded in the reverse manner when the ship reaches its destination. More particularly the invention relates to a system for lifting, guiding and securing lighters as well as hatch covers aboard a ship during the vertical and horizontal travel while the lighters are being placed aboard or overboard and the hatch covers are being placed over a hatch or removed from a hatch for storage during the loading operation, by the hoist mechanism of a traveling shipboard gantry crane. Among other things, the handling system includes means carried by a traveling shipboard gantry crane for restraining swinging movement of a lighter or hatch cover suspended by hoist ropes during travel of the crane along the ship's deck. The system also includes means for positioning a load frame suspended by rope falls from the hoist mechanism of the gantry crane, on a floating lighter and thereafter securely latching the load frame to the lighter for lifting and transporting. This same mechanism is used in connection with the handling of hatch covers. The system also provides for the guiding of a lighter while it is being lifted from the water to the level of the ship's deck in a loading well at the stern of the ship, and while it is being lowered into the ship's hold.

U.S. patent application Ser. No. 572,052 filed Aug. 12, 1966, now Patent No. 3,390,657, discloses a traveling shipboard gantry crane for handling lighters in connection with the seagoing transport system to which the present invention relates and U.S. Patent No. 3,273,527 shows a lighter carrying ship adapted for use in connection with the system. As indicated in the disclosures of the above patent and patent application, ships designed to carry lighters in accordance with the present seagoing transport system do not provide a stable platform in that varying conditions of keel trim and port or starboard list can normally be expected during loading and unloading of the lighters. Accordingly the gantry crane must be capable of operating under these conditions. Another operational requirement of the traveling shipboard gantry crane, not mentioned in the above disclosures, is the desirability and in fact the logical necessity for transporting hatch covers with the same shipboard gantry crane that handles the lighters. Thus the covers for the hatches through which the lighters are lowered to or raised from the cargo holds, must be lowered into place and carried to a storage location during loading and unloading operations by the same traveling gantry crane and consequently by the same load frame suspended from the hoist mechanism of the crane.

When the lighter or hatch cover to be transported by the crane is lifted to a traveling position between the gantry legs at a height sufficient to provide vertical clearance above any obstructions on deck (such as stacked empty lighters or stacked hatch covers), the travel longitudinally of the ship will tend to swing the lighter or hatch cover in the hoist ropes. While swinging movement could be confined by mounting stationary vertical restraining members on the gantry legs engageable with the corners of either the lighter or the load frame, the same means could not be used in connection with the hatch covers since the covers must necessarily have greater horizontal dimensions than the cargo holds through which both the lighter and the load frame must be lowered. Consequently such a stationary restraining member would block the vertical movement of a hatch cover.

Moreover while stationary restraining members on the gantry legs might prevent swinging of the lighter or hatch cover while being carried between the gantry legs, they would not prevent swinging movement of the lighter while suspended below the deck of the ship in the loading well or within a cargo hold.

Another problem is that of guiding a floating lighter into position in a loading well at the stern of the ship and locating it accurately for connection to a load frame suspended from the hoist mechanism.

The guiding and securing system and the gantry crane hoist mechanism of the present invention satisfy the problems indicated above and afford other features and advantages not obtainable from the prior art.

SUMMARY OF THE INVENTION

It is among the objects of the invention to restrain swinging movement of a lighter or a cargo hatch cover suspended by a traveling shipboard gantry crane hoist mechanism, while the lighter is being transported between an outboard floating position and a ship's cargo hold, and while the hatch cover is being either secured or removed, or transported between its cargo hatch and a storage location.

Another object is to facilitate the positioning of a floating lighter in a loading well at the stern of a lighter carrying ship in order to accurately locate it for connection to a load frame suspended from a hoist mechanism.

Still another object is to facilitate the positioning and stowage of lighters in superposed relation in the cargo hold of a ship.

These and other objects are accomplished by a shipboard system including vertical guide members secured to the ship in the loading well and adapted to guide vertical travel of the load frame and lighter within the well, and vertical guide means on the gantry crane legs for restraining swinging movement of the barge and load frame while suspended between the legs of the gantry crane, the vertical guide means also being adaptable to accommodate vertical travel of a hatch cover being carried by the load frame between the gantry legs.

BRIEF DESCRIPTION OF THE DRAWINGS

FIGURE 1 is a fragmentary elevational view of a lighter carrying transport ship adapted for use in connection with the seagoing transport system to which the invention relates;

FIGURE 2 is a fragmentary plan view of the transport ship of FIGURE 1;

FIGURE 8 is a fragmentary transverse sectional view taken on the line 8—8 of FIGURE 3;

FIGURE 9 is a plan view on an enlarged scale of the swell compensating mechanism shown in FIGURE 8, with parts broken away and shown in section;

FIGURE 10 is a fragmentary sectional view on an enlarged scale taken on the line 10—10 of FIGURE 3 showing in particular the winch drive mechanism and rope drums;

FIGURE 14 is a fragmentary elevational view showing a modified form of load guide system used in connection with a gantry crane otherwise identical to the crane of FIGURE 3, with a lighter being carried by the load frame in the uppermost traveling position;

FIGURE 15 is a fragmentary sectional view taken on the line 15—15 of FIGURE 14; and FIGURE 16 is a fragmentary elevational view similar to FIGURE 14 showing the load frame carrying a hatch cover.

DESCRIPTION OF THE PREFERRED EMBODIMENTS

Referring more particularly to the drawings and initially to FIGURES 1 to 4 there is shown a transport ship A adapted to carry cargo laden lighters B of a gross weight of about 500 T in accordance with the seagoing transport system to which the invention relates. The ship A has a traveling shipboard gantry crane C located for travel on spaced rails D extending longitudinally along opposite sides of the ship's deck, and also out onto spaced outboard cantilever stern beams E which provide a platform on which the crane C may travel to an outboard position shown in FIGURE 3, over a loading well at the stern of the ship for lifting a floating lighter B from the water. The crane C is operable to lift a lighter B out of the water and vertically upward to a position between the gantry legs and above the cargo hatches F of the ship, clear of any obstructions on deck such as empty lighters, and likewise to transport the lighter B along the ship's deck to a particular cargo hatch F and then lower it into a cargo hold H for storage. The gantry crane C is also adopted to handle hatch covers G during removal and emplacement thereof.

SHIP CARGO HANDLING SYSTEM

Figure 3:
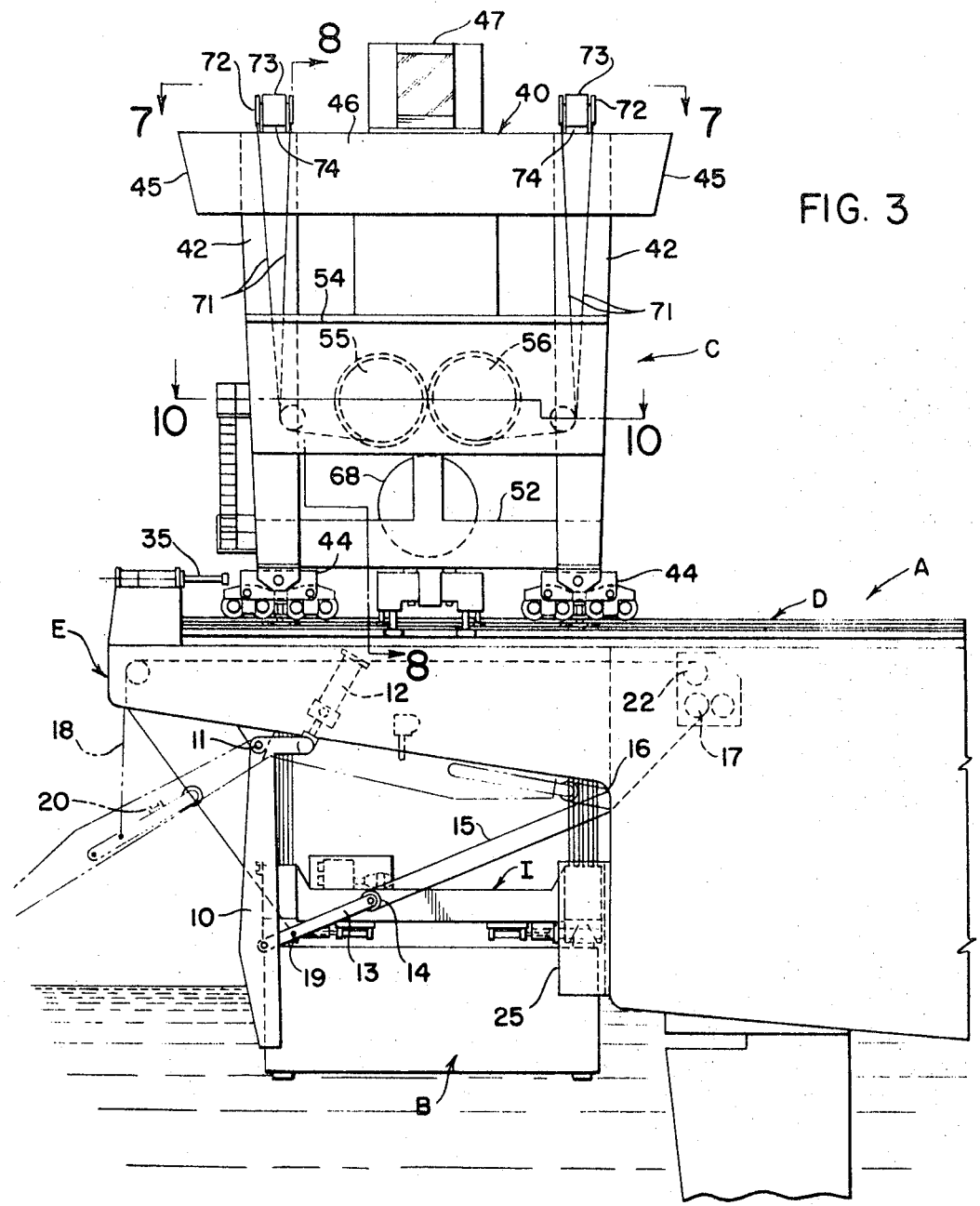
FIGURE 3 is a fragmentary side elevational view on an enlarged scale taken on the line 3—3 of FIGURE 2, showing a gantry crane embodying the invention positioned on cantilever beams over a loading well at the stern of the ship and preparing to lift a floating lighter from the water.
Figure 4:
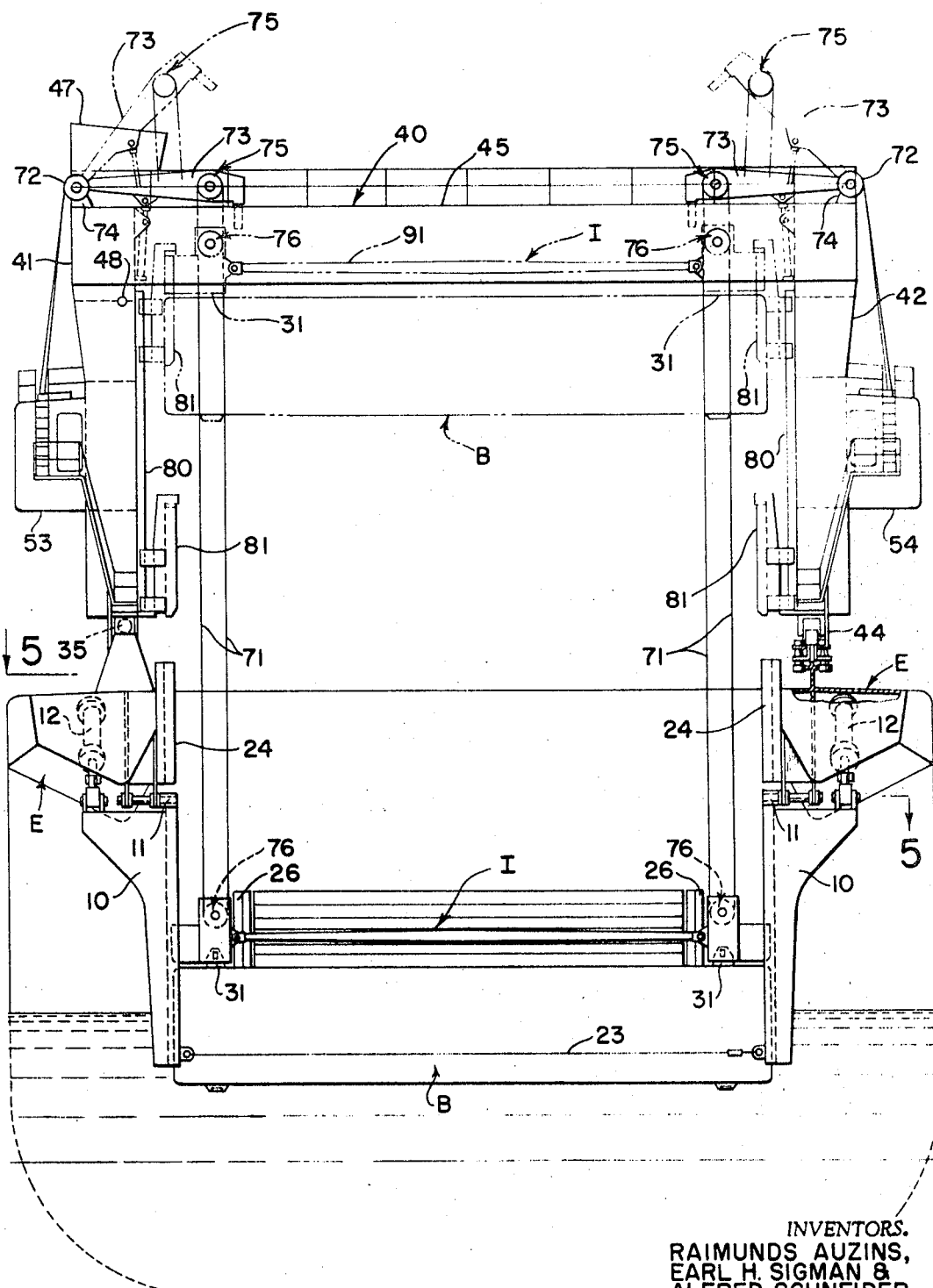
FIGURE 4 is an end elevational view taken on the line 4—4 of FIGURE 1.

Referring to FIGURES 3 and 4 it will be seen that during the lifting of lighters B from the sea, the gantry crane C is positioned on the cantilever stern beams E with its legs astride a loading well in which a floating lighter B is positioned. In order to accomplish the accurate positioning of the lighter B in the loading well, two lead-in stern guides 10 are provided, one end of each being pivotally connected by either a ball joint 11 or universal joint to the rearward ends of each stern beam E at spacings which enable the guides to engage the rearward corners of a lighter to be positioned for lifting onto the ship A. It will be seen that the stern guides 10 are movable between a stowed position shown in dashed lines in FIGURE 3 and a rearwardly extending ready position also shown in dashed lines. The lateral position of the guides is restricted by means of hydraulic shock absorbers 12 (FIGURE 4) which serve to absorb lateral jolts and shocks as well.

The stern guides 10 swing forward to engage a floating lighter B being moved into the loading well by a tug and then swing further inward to accurately position the lighter B in the well for connection to a load frame I carried by the hoist mechanism of the crane C.

Each stern guide 10 is operated by means of a link 13 pivotally connected intermediate the ends of the stern guide and having a pulley 14 mounted on its other end through which a winch rope 15 is reaved. One end of the rope 15 is connected to the ship at 16 and the other end extends diagonally upward to a constant tension rope drum 7 of a winch mechanism within the ship's structure.

Another rope 18 having one end connected to the link 13 at 19 is used to move the guide 10 to its most rearward position shown in dashed lines in FIGURE 3, the movement of the link 13 being limited by a stop 20 on the stern guide. The rope 18 passes around a pulley 21 and thence to a rope drum driven by the same drive as the drum 17.

Figure 5:
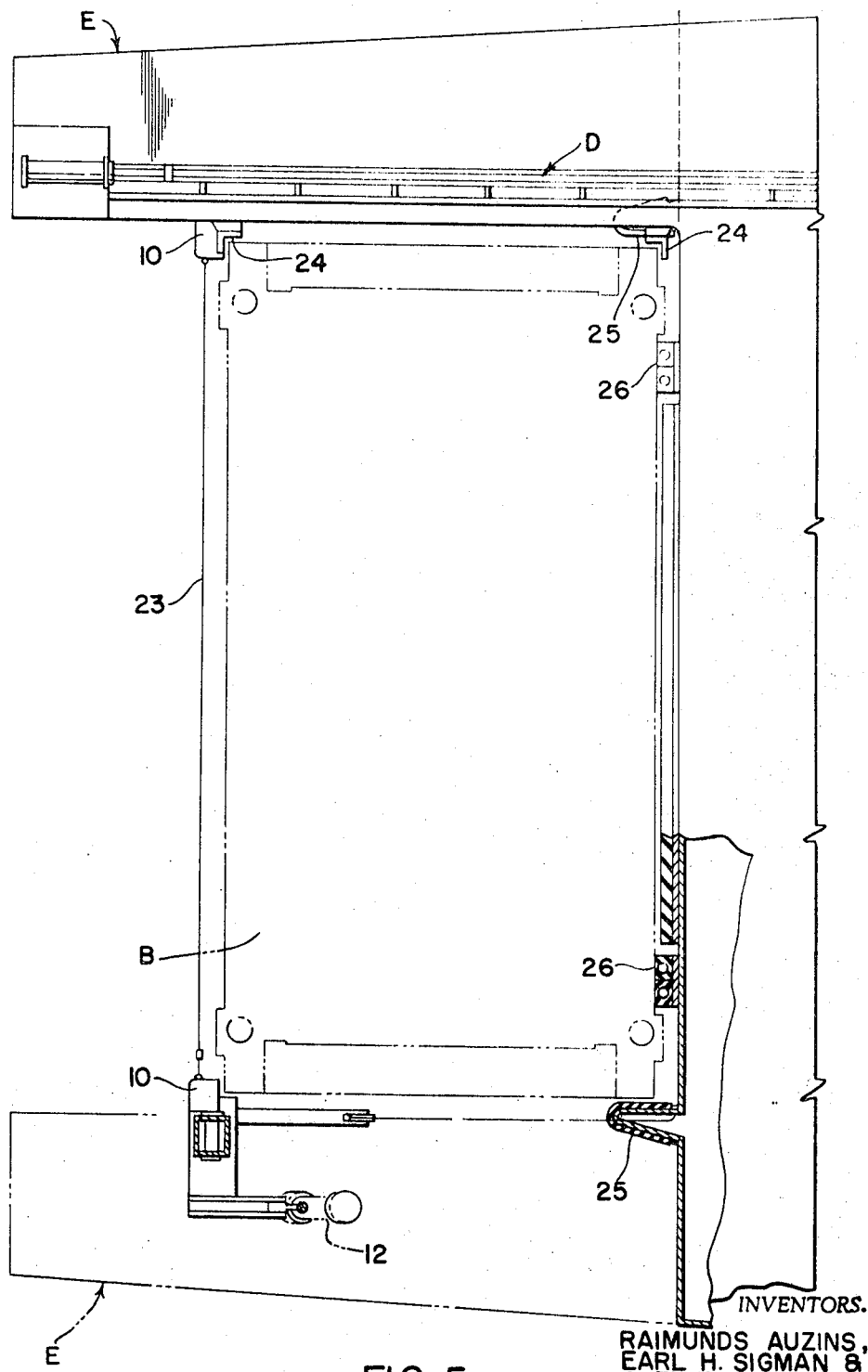
FIGURE 5 is a cross sectional view taken on the line 5—5 of FIGURE 4.

The stern guides are connected to one another at their outer ends by a cable 23 which helps maintain proper spacing to assure proper guiding of the lighter. As shown in FIGURE 5, the stern guides 10 have an L-shaped cross section for engaging the corners of a lighter B.

Additional guiding and restraining of a lighter B within the loading well is provided by means of fixed vertical guides 24 located on the outer ends of the cantilever stern beams E in end to end alignment with the stern guides when in the position shown in solid lines in FIGURES 3, 4 and 5, and fixed vertical guides 25 located on the stern wall of the ship A. Rubber bumpers 26 are also provided on the stern wall to absorb shock loads when a lighter heaves against the stern of the ship.

The load frame I is also guided for vertical travel when in the loading well by the fixed vertical guides 24 and 25 and the stern guides 10 to prevent swinging of the load frame and to accurately position it while it is being lowered unto the lighter B for connection in a manner to be more fully described below. During the lifting movement the lighter B is restrained from swinging movement by the stern guides 10 and fixed vertical guides 24 and 25 until it reaches the level of the gantry crane C.

Once the lighter B reaches the level of the gantry crane legs it is guided by structure supported by the legs in a manner to be described below in connection with the gantry crane itself. A lighter B is normally carried at a position within the gantry crane C at the height indicated in dashed lines in FIGURE 4. In this position the lighter B will clear at least one lighter stacked on top of one of the hatch covers G.

Figure 6:
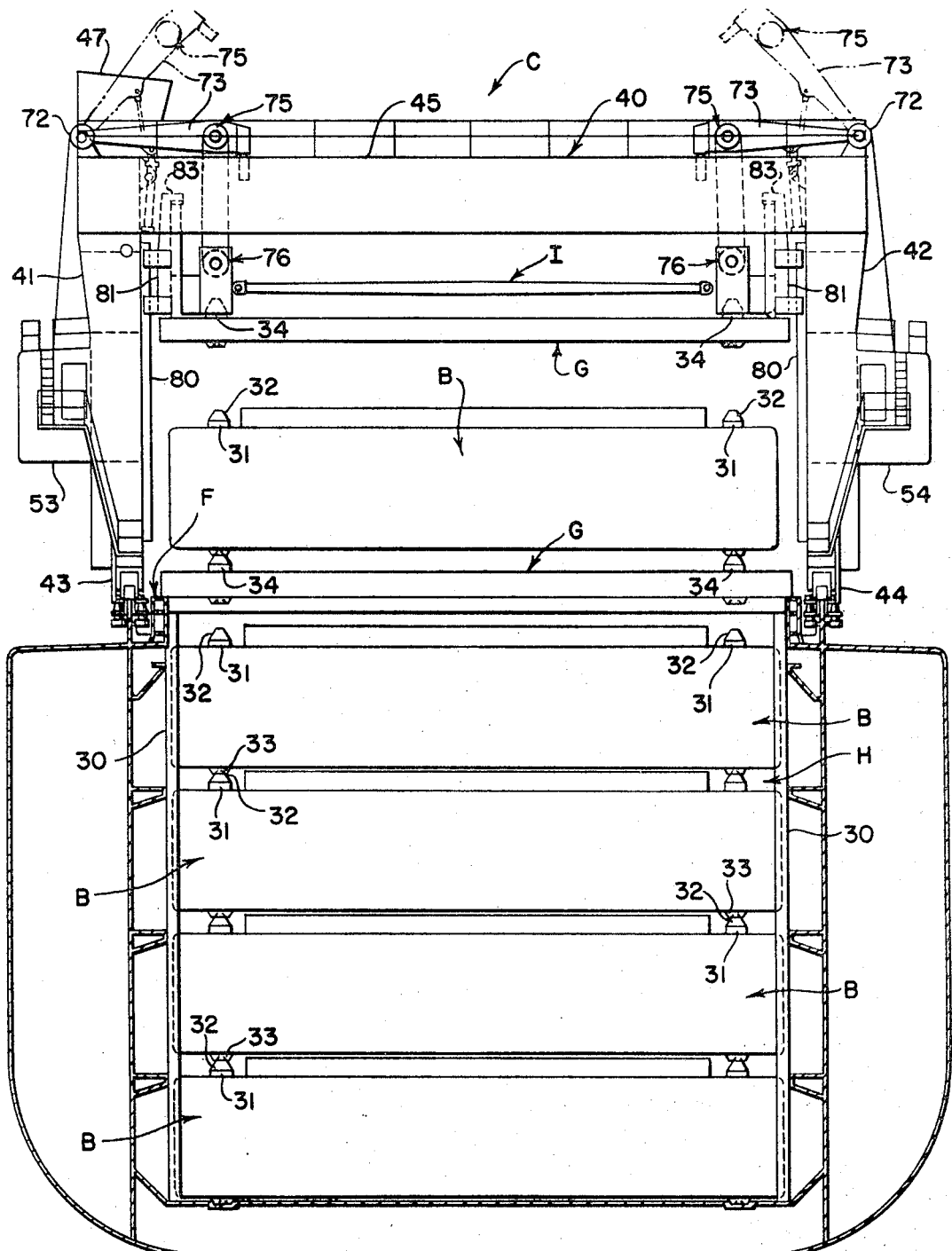
FIGURE 6 is a transverse sectional view on the same scale as FIGURE 3, showing the gantry crane carrying a hatch cover and positioned over a cargo hold loaded with four lighters, a hatch cover positioned over the hold and a lighter stacked on top of the hatch cover.
Figure 7:
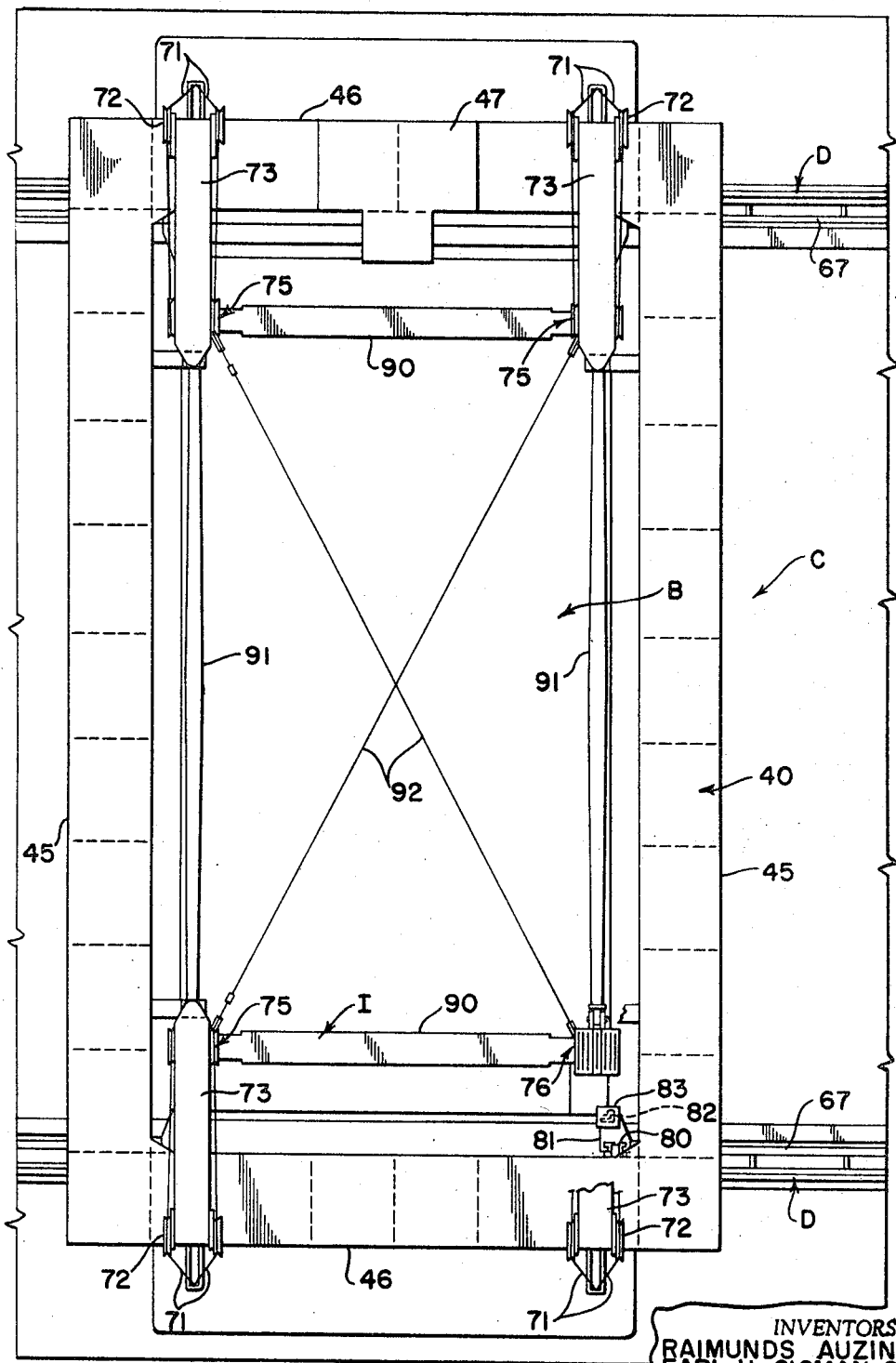
FIGURE 7 is a plan view of the traveling shipboard gantry crane in the position shown in FIGURE 5 with one swell arm broken away for the purpose of illustration.

When the crane C has moved longitudinally along the ship A while carrying the lighter B to a position over the cargo hold H in which the lighter B is to be stored, the lighter B is lowered through the hatch F and into the hold H wherein the corners of the lighter are guided by fixed vertical guides 30 mounted at the corners of the hold H (FIGURE 6). In the embodiment shown four lighters B may be loaded in each cargo hold H.

Each lighter B is provided with four-corner posts 31 having a tapered top 32 of pyramid shape and a matching recess in the bottom (FIGURE 8). The posts 31 are of considerable strength and are capable of supporting the weight of the lighter itself as well as three or more additional lighters stacked in superposed relation on top of one another as shown in FIGURE 6.

Accordingly the lighters B are secured in place one on top of the other by means of the corner posts 31 with the tapered top 32 and matching recess 33 as shown in FIGURE 6 whereby lateral movement of the barges relative to one another is restrained thus preventing shifting of the barges in the cargo hold H.

Once a cargo hold H is full the gantry crane C may be used to carry a hatch cover G (FIGURE 6) to a position over the cargo hatch F, and then to lower the cover G unto the hatch F to close the hold H and secure it for sea conditions. The hatch cover G has upwardly extending posts 34 with tapered tops and recessed bottoms which match those of the posts of the lighters so that empty lighters for example may be stacked on top of the hatch covers F (FIGURE 6).

When the ship is under way the gantry crane C will be secured at a predetermined position on the rails. Bumpers 35 are provided at each end of the rails D to limit the forward and rearward travel of the crane.

GANTRY CRANE CONSTRUCTION

The gantry crane C is a massive structure comprising a rectangular frame 40 carried on two port legs 41 and two starboard legs 42, the legs 41 and 42 being connected to traveling carriages 43 and 44 respectively which provide for travel of the crane C on the rails D.

The frame 40 includes two transverse girders 45 which have longitudinal dimensions sufficient to span the width of the cargo hatches F, and end girders 46 which extend longitudinally of the ship. An operator's cab 47 is located on one of the end girders 46. The girders 45 and 46 are of plate and torsion box construction according to current practice. Referring to FIGURES 3, 4 and 8 it will be seen that the port legs 41 are connected to the frame by a hinge which permits the legs 41 to pivot in a plane perpendicular to the direction of travel of the carriages 43 and 44 on the rails D.

The connection at each leg 41 is made by means of hinge pins 48. The purpose of the hinge connections is to permit the gantry crane to travel freely on the rails when variations occur in the lateral spacing between the rails. The carriages for the crane as well as the drive mechanism therefor are substantially of the construction disclosed in the above mentioned U.S. patent application Ser. No. 572,052, now Patent No. 3,390,657.

The drive machinery is located within horizontal sills 51 and 52 extending between the lower ends of the gantry legs 41 and 42 at each side parallel to the girders 46. The sills are of enclosed box construction and are water tight to protect the drive motors, reducers, etc. located within.

The hoist machinery is located in separate enclosures extending between the gantry legs 41 and 42 at each side above the sills 51 and 52. The enclosures 53 and 54 are also water tight to protect the hoist machinery and may be partially formed of aluminum to reduce weight. As shown in FIGURE 5 the enclosures extend laterally outward from the crane C and have access doors at each end.

The hoist machinery includes two rope drums 55 and 56 in each hoist machinery enclosure, 53 and 54, which are mechanically interlocked at the drum gears 57 and 58 and which are individually driven by separate motors 59 and 60 through a worm speed reducer 61 and 61 and intermediate pinion shaft. The motors 59 an 60 are mechanically interlocked by means of a geared coupling 63 at the high-speed end and each motor 59 and 60 is provided with a solenoid operated brake 64 and 65. With this arrangement the loss of a motor on either side of the crane or one on each side simultaneously will not prevent the operation of the hoist equipment.

The power supply to the motors 59 and 60 is provided by means of a cable 66, along one side of the ship A. The cable 66 is located in a cable trough extending parallel to the adjacent rail (FIGURE 8). The cable 66 winds around a cable reel 68 which is of a spool configuration and winds multilayers of cable in order to accommodate the complete range of travel of the crane C on the ship A. The reel 68 is driven by a hydraulic drive which results in a uniform cable tension.

Two hoist ropes 71 from each drum 55 and 56 extend upwardly through the enclosures 53 and 54 to one of the four corners of the frame 40 and each rope 71 wraps around a stationary sheave 72 of a swell arm 73 of the type embodying the invention of U.S. patent application Ser. No. 572,052, now Patent No. 3,390,657, each swell arm 73 being adapted to pivot about bearing brackets 74 located on the frame members 46 at the top of the crane C between the gantry legs. As defined in application Ser. No. 572,052, now Patent No. 3,390,657, the purpose of the swell arms 73 is to compensate for the vertical movement of a lighter B floating in the sea during the latching and hoisting operations. At the end of each swell arm 73 is a sheave nest 75 consisting of a number of sheaves on a common pin to accommodate rop falls which extends downward to a matching sheave nest 76 on the load frame I.

GANTRY CRANE LOAD GUIDE SYSTEM

As indicated above with respect to the ship's load guide system, lighters B being suspended by the hoist mechanism between the gantry legs are restrained from swinging movement which might be expected during the longitudinal travel of the crane C on the rails D, by means of a special system which accommodates the handling of both lighters B and hatch covers G.

According to the preferred embodiment each gantry leg 41 and 42 is provided with a guide rail 80 along which a guide carriage 81 can slide within a vertical range of movement which enables it to engage a corner of a lighter B during the limits of travel of the lighter B between the gantry legs.

Referring to FIGURES 8, 10, 11 and 13 it will be seen that the guide carriages 81 have an L-shaped horizontal cross section and are of sturdy construction so as to withstand severe dynamic loads encountered during speed changes and varying conditions of list and trim.

The load frame I which is also received within the outside corners 82 defined by the guide carriages 81, has laterally protruding end portions which engage the corners 32 so that its swinging movement on the hoist ropes is restrained and confined. However the horizontal loads imposed by the lighter B are applied directly to the guide carriages 81 to avoid the application of excessive horizontal loads to the load frame I.

At the top of each guide carriage 81 is a stop in the form of a plate 83 extending over the outside corners 82. The plate 83 engages the top of the load frame I so that the load frame I will lift the guide carriages 81 as a lighter B is raised within the gantry legs. This enables the guide carriage 81 to be effective throughout the entire vertical travel of a lighter B within the gantry legs.

As indicated above, the guide carriages 81 must be effective to restrain swinging movement of a hatch cover G as well as a lighter B being handled by the load frame I. However, the lateral dimensions of the hatch covers G must necessarily be greater than those of the lighters B in order to cover the hatches F through which the lighters B are raised and lowered. FIGURE 6 illustrates the condition of the load frame I and guide carriages 81 when a hatch cover G is being handled. Since the weight of the hatch cover G is relatively small compared to a lighter B there is no need to transmit horizontal loads caused by the handling of a hatch cover G, directly to the guide carriages 81 since they may be easily transmitted through the load frame I itself. Accordingly when the load frame is lowered to pick up a hatch cover G the downward movement of the guide carriages 81 is stopped when they engage the top of a hatch cover G and the load frame I then slides to the lower end of each guide carriage until it connects to the upwardly extending posts 34 on the hatch cover G.

When latching is complete the hatch cover G may be lifted while at the same time the guide carriages 81 are raised in the condition shown in FIGURE 6 and the hatch cover may be lifted to sufficient height to clear obstructions on the ship's deck.

With this arrangement it will be seen that the proper handling and guiding of both lighters B and hatch covers G is accomplished with one relatively uncomplicated mechanism.

LOAD FRAME CONSTRUCTION

Figure 11:
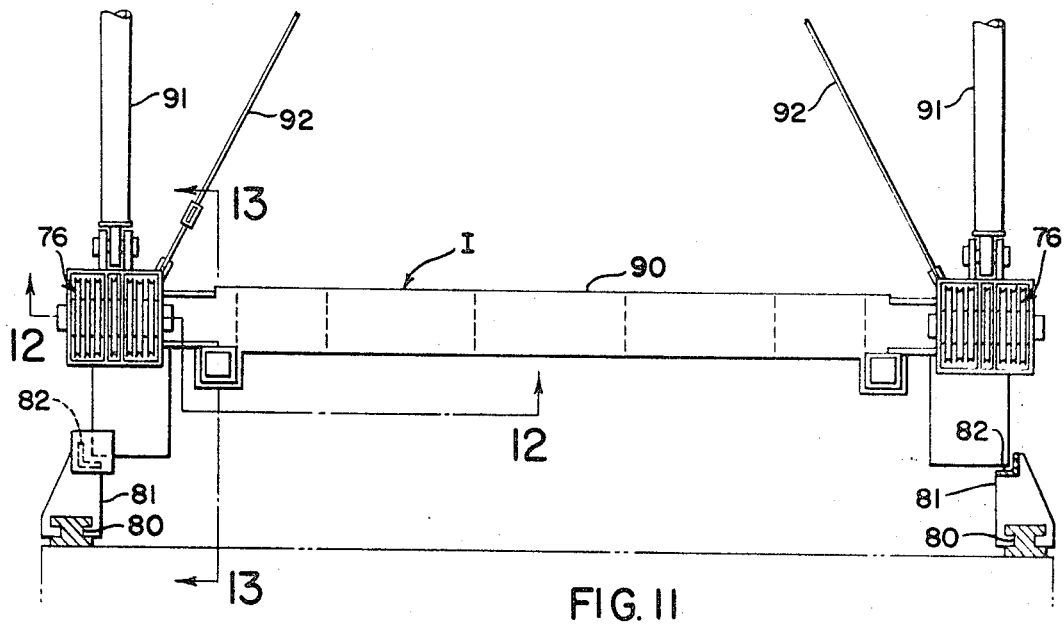
FIGURE 11 is a fragmentary plan view showing the load frame of the crane of FIGURE 3 and the vertical load guide members.
Figure 12:
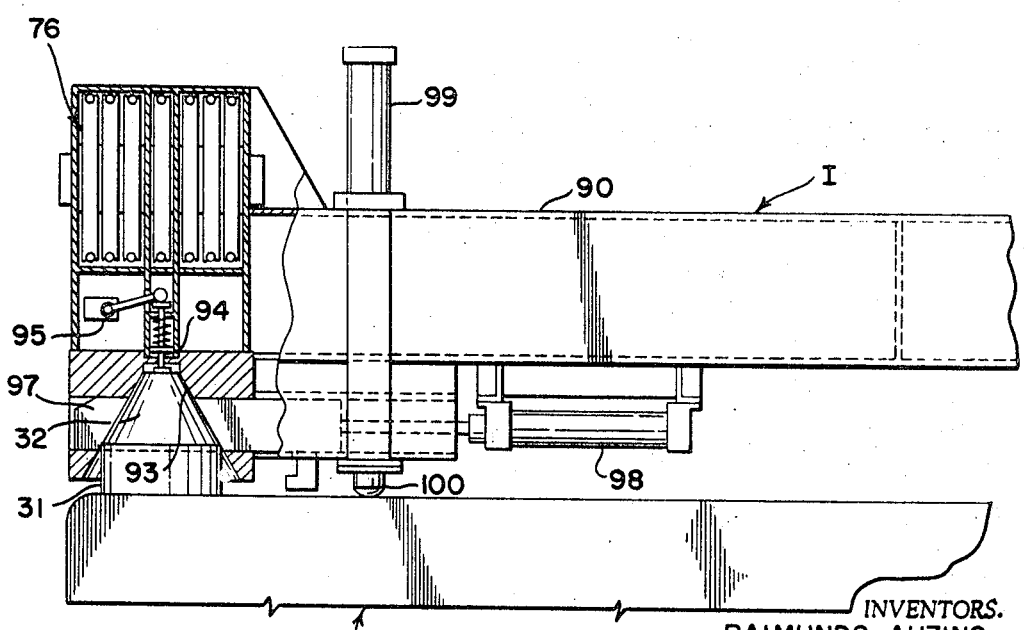
FIGURE 12 is a fragmentary sectional view on an enlarged scale taken on the line 12—12 of FIGURE 8.
Figure 13:
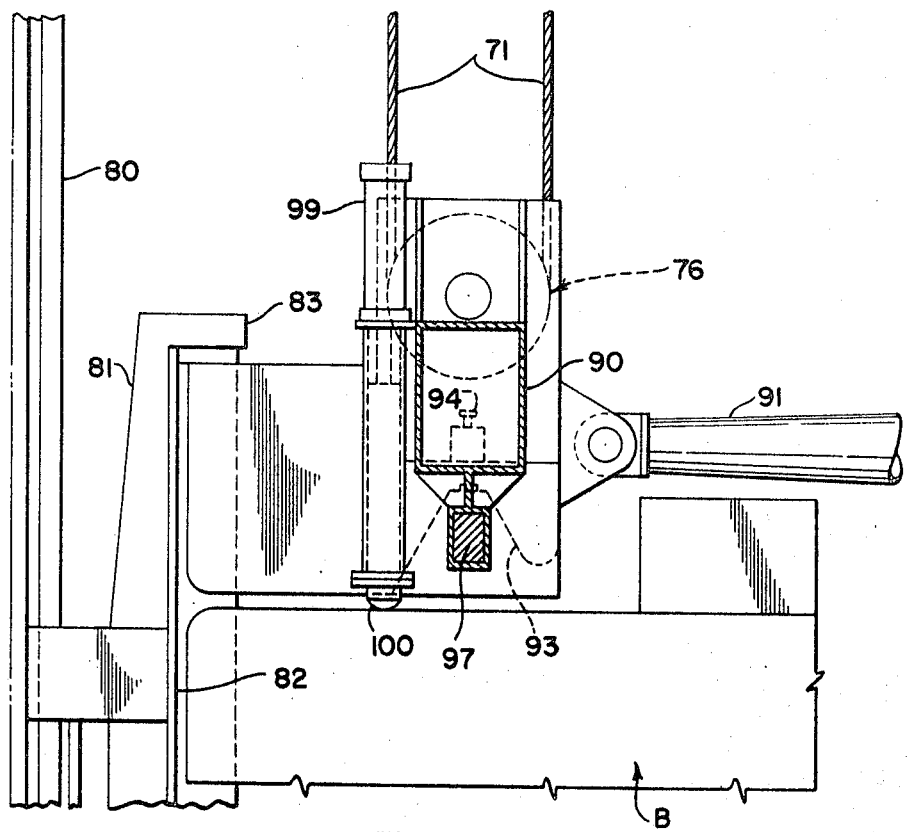
FIGURE 13 is a fragmentary sectional view on an enlarged scale taken on the line 13—13 of FIGURE 11.

FIGURES 11 to 13 illustrate the unique construction of the load frame I which is suspended from rope falls by the hoist mechanism as described above. The load frame I comprises starboard side and portside load beams 90 which are connected by tubular members 91 into an articulated skeletal frame arrangement. Diagonal brace cables 22 prevent collapse and twisting of the mechanism however the construction permits the opposite load beams 90 to move out of coplanar relation to one another. At each corner of the load frame I is a latch mechanism (FIGURES 11 and 12) comprising a pyramid shaped recess 93 adapted to match the tapered top portions 32 of the posts 31 and 34 located at each corner of the lighters and of the hatch covers G. The tapered configuration of the posts 31 and 34 and recesses 93 in the load frame assures accurate alignment of the load frame I relative to the lighters B and hatch covers G and also permits the crane operator some margin of error in dropping the load frame into position, the recesses 93 serving as a centering and locating means.

When a post 31 or 34 is seated within a tapered recess 93 the top of the post forces a spring loaded plunger 94 upward to trip a switch arm of a limit switch 95 which actuates a latching mechanism. The tapered end 32 of each post 31 and 34 is provided with a horizontal closed slot 96 of rectangular cross section which is adapted to receive a rectangular latch bolt 97. The latch bolt 97 is operated by a hydraulic cylinder 98 which is actuated upon tripping of the limit switch 95.

Because the load frame I is frequently dropped upon a lighter B or hatch cover G with considerable impact, hydraulic shock absorbers 99 are provided at each corner of the load frame I on top of the load beams 90. The shock absorbers 99 are vertically mounted and have a piston 100 which extends downwardly through the load beam 90.

FIGURES 14, 15 AND 16

FIGURES 14, 15 and 16 show an alternative load guide mechanism for use in connection with the gantry crane C described above. This arrangement differs from that shown in FIGURES 6 to 13 in that each gantry leg 41 and 42 is provided with two extendable guide members 101 and 102 mounted one-on-top-of-the-other, instead of the vertical rails 80 and guide carriages 81 of the embodiment described above. The members 101 and 102 are moveable between an extended position and a retracted position as shown in FIGURE 14 by means of hydraulic cylinders 103 pivotally connected between the members 101 and 102 and the gantry leg, the members 101 and 102 being connected to the gantry leg by means of parallel links 104.

When the members 101 and 102 are extended they are closely adjacent to or in contact with the corners of both a lighter B and the latch frame I to restrain swinging movement thereof in the hoist ropes 71. Accordingly when a lighter B or the load frame I alone is being raised or lowered both members 101 and 102 are in their extended position. When a lighter B is being transported at the upper most position between the gantry legs (FIGURE 14) only the guide member 101 is extended, the member 102 being retracted to provide sufficient clearance between obstructions located on deck during longitudinal travel of the crane C along the rails D.

When the load frame I is carrying a hatch cover G both members 101 and 102 are retracted in order to provide adequate clearance for the hatch cover G between the gantry legs. In order to restrain swinging movement of the hatch cover G being carried, the end of the load frame I has an extendable guide arm 105 pivotally mounted at each corner. The guide arm is pivotable into the position shown in FIGURE 16 where it is located closely adjacent to or in engagement with one of the guide members 101 and 102.

Movement of the guide arm 105 between its extended and retracted position is accomplished by means of a hydraulic cylinder 106 pivotally connected to the load frame I and having its piston 107 pivotally connected to the guide arm 105. Accordingly sufficient clearance is provided for the hatch cover G between the gantry legs while at the same time swinging movement is restrained by means of the extended arms 105 which are engageable with the adjacent retracted guide member 101 or 102.

OPERATION

During the loading of cargo laden lighters on a lighter carrying transport ship A the traveling gantry crane C is initially positioned on the cantilever stern beams E so that it overlies the loading well at the stern of the ship as shown in FIGURE 3. Initially the stern guides 10 are moved to their rearward most position shown in dashed lines in FIGURE 3 with the necessary lifting force being applied through the rope 18 by means of the rope drum 22. The floating lighter B to be lifted aboard is pushed into position within the loading well by a tug after which the stern beams 10 are moved to their vertical positions shown in solid lines by the rope 15 wound on the rope drum 17. As the stern beams 10 engage the corners of the lighter B they force the lighter B up against the stern wall of the ship so that the corners are confined between the fixed vertical guide members 25.

During this positioning operation the hoist mechanism of the crane C will normally have been operating to lower the load frame I from its position between the gantry legs to a latching position within the loading well. The downward movement of the load frame I is initially guided by the guide carriers 81 which slide along the vertical rails 80 secured to each gantry leg. As the load frame I drops below the level of the ship's deck it is guided by the fixed vertical guides 24 secured to the insides of the cantilever stern beams E within the loading well and ultimately by the stern guides 10 and the fixed vertical guides 25.

The recesses 93 at the corners of the load frame I drop over the tapered tops 32 of the corner posts 31 and thus accurately position the load frame I for latching. The tapered tops 32 push the plunger 94 upward to actuate the limit switch 95 which in turn energizes the control circuit for the hydraulic cylinders 98 which force the latch bolts 97 through the slots 96 in the tapered tops 32 (FIGURE 12). The initial shock of the load frame I falling on the lighter B is dampened by the shock absorbers 99.

After the latching is complete the winch motors 59 and 60 are operated to turn the rope drums 55 and 56 and begin the lifting movement. Any tossing of the lighter B in the loading well due to sea swell during the initial lifting is compensated for by the swell arms 73 which are able to swing upward and maintain tension in the hoist ropes 71. During normal lifting the swell arms 73 are pulled down to their horizontal position shown in solid lines in FIGURE 4.

Lifting movement of the lighter B is initially guided by the stern guides 10 and the fixed vertical guides 25. However, when the lighter B reaches a position between the outboard cantilever beams E it is guided and swinging movement thereof is restrained by the fixed vertical guide members 24 secured to the insides of the cantilever beams E within the loading well. As the lighter B is raised to a position between the gantry legs 41 and 42, the corners of the load frame I and the lighter B move upward within the confines of the guide carriages 81 which are initially positioned as shown in solid lines in FIGURE 4. Thus any lateral loads caused by a tendency of the lighter B to swing in the hoist ropes 71 or by listing or roll of the ship A, are transmitted directly to the gantry legs 41 and 42 through the guide carriages 81 which engage the corners of the lighter B. At the conclusion of the lifting operation the lighter B is positioned as shown in dashed lines in FIGURE 4, the guide carriages 81 having been lifted along with the load frame I and the lighter B. At this height the lighter B is spaced sufficiently above the ship's deck to clear at least one empty lighter B stored on top of a hatch cover G, or a group of hatch covers G stacked on top of one another.

With the lighter B in this position, the gantry crane C is propelled longitudinally of the ship along the rails D toward the bow of the ship to a position over the open cargo hatch F through which the lighter B is to be lowered. The hatch cover G will have been previously removed by the gantry crane B in a manner to be described below. At this time the gantry crane is braked to a stop and the brakes are locked to prevent movement on the rails. The winch motor 59 and 60 are then operated in a reverse direction to lower the lighter B into the hold H to a storage position either at the bottom of the hold H or on top of another lighter B. During the lowering, swinging movement of the lighter B and the load frame I is restrained by the guide carriages 81 until the guide carriages reach the lower limits of their vertical travel. After the lighter B drops below the guide carriages 81 in their lowermost position, swinging movement of the lighter B is restrained by the fixed vertical guides 30 mounted within the hold H of the ship. Where a lighter B is to be positioned over another lighter in the hold H, the recesses 33 receive the tapered tops 32 of the posts 31 of the lighter B below thus accurately aligning and positioning the lighter B for storage. With the lighter thus positioned, the crane operator operates the hydraulic control system of the load frame I to release the latch bolts 97 from the slots 96 and then operates the hoist motors 59 and 60 to raise the load frame I to its uppermost position between the gantry legs 41 and 42.

When a hold H is fully loaded with 4 lighters as is usually the case, the crane C is propelled along the rails D to a position over a hatch cover G for the cargo hatch F. The load frame I is then lowered into position over the hatch cover G and finally dropped into a position with the tapered tops of the hatch cover posts 34 received within the recesses 93 of the load frame I in the same manner described with respect to the connection of the load frame I to the lighters B. When the load frame I is properly latched to the hatch cover G the hoist mechanism is again operated to lift the hatch cover G upward between the gantry legs.

As indicated in FIGURE 6 the corners of the hatch cover G engaged the bottoms of the load guides 81 so that the load guides 81 are lifted by the hatch cover G rather than by the corners of the load frame I. Swinging movement of the hatch cover G is restrained through the engagement of the guide carriages 81 with the load frame I.

When the gantry crane C reaches a position over the cargo hatch F on which the hatch cover G is to be placed, the winch mechanism is operated again to lower the hatch cover G into position. The removal of the hatch cover G and storage thereof during the loading operation is accomplished in the reverse manner.

It will be apparent that a similar operating sequence may be used to store empty lighters B on top of the emplaced hatch covers as shown in FIGURE 6. During the unloading operation in which the lighters B are returned to a floating position in the loading well outboard of the ship, the operation is just the reverse with the stern guides 10 being used to guide the lowering of the lighter B into the water.

According to a modified form of the gantry crane illustrated and described herein outboard cantilever extensions may be pivotally connected to one of the transverse girders 45 for pivotal movement between an inboard position extending parallel to an end girder 46 and an extended outboard position in end-to-end alignment with the transverse girder 45. The aligned transverse girder 45 and the outboard extensions may be provided with parallel rails which support a traveling trolley car of the type disclosed in U.S. application Ser. No. 588,815, the trolley car carrying a hoist mechanism adapted to handle cargo containers to be lifted from a dock and loaded aboard the ship A in order to enlarge the ship's cargo carrying capabilities.

While the invention has been shown and described with reference to specific embodiments thereof, this is intended only for the purpose of illustration rather than limitation and other variations and modifications will become apparent to those skilled in the art within the intended spirit and scope of the invention as herein specifically illustrated and described. Therefore the patent is not to be limited in scope and effect to the preferred forms illustrated and described herein nor in any other way that is inconsistent with the progress by which the art has been advanced by the invention.

We claim:

1. In apparatus for handling lighters and cargo hatch covers aboard a ship, the lighters being transported between a floating position in a loading well of the ship and a storage position aboard the ship, and the apparatus including a gantry crane adapted for longitudinal travel on the ship with its legs astride the ship's cargo hatches, hoist mechanism associated with the crane and a load frame suspended for vertical movement by said hoist mechanism, the improvement which comprises:

guide members on said gantry crane for restraining swinging movement of said load frame when located between the legs of said gantry crane, said members being movable between a first position relative to said load frame, in swing restraining relation to said load frame and a lighter carried thereby and accommodating vertical travel of said lighter, and a second position relative to said load frame accommodating vertical travel of a hatch cover carried by said load frame between said gantry legs.

2. Apparatus as defined in claim 1 wherein said guide members comprise a flanged vertical rail secured to the inward side of each gantry leg, a guide carriage connected for vertical sliding movement to said rail between an uppermost and a lowermost position, said guide carriages defining inside corners adapted to be closely spaced from the adjacent outside corners of said load frame and a lighter carried by said load frame between said gantry legs, and having stops at the upper ends thereof adapted to engage the outside corners of said load frame whereby said carriages are raised by said load frame located therebetween to a position above and clear of obstructions on deck to accommodate longitudinal travel of said crane on said ship.

3. Apparatus as defined in claim 2 wherein the lower ends of said guide carriages are engageable by the corner portions of a cargo hatch cover located below whereby said carriages are raised to accommodate vertical movement of a hatch cover between said gantry legs while being carried by said load frame.

4. Apparatus as defined in claim 1 wherein said guide members comprise an upper vertical guide and a lower vertical guide mounted end to end on the inward side of each gantry leg, said guides being connected independently to said gantry leg by parallel links for movement between an extended position and a retracted position whereby said guides when extended define inside corners closely spaced from the adjacent outside corners of said load frame and a lighter carried thereby between the gantry legs to restrain swinging movement thereof, and when retracted, accommodate vertical travel of a hatch cover carried by said load frame and travel of said gantry crane longitudinally of said ship clear of lighters and hatch covers located on deck.

5. Apparatus as defined in claim 4 in combination with a load frame having an extendable guide arm located adjacent each gantry leg, said guide arm being movable between a retracted position and an extended position closely spaced from one of said vertical guides on said adjacent gantry leg when said vertical guide is retracted, to restrain swinging movement of said load frame when carrying a cargo hatch cover with the adjacent vertical guides retracted.

References Cited

UNITED STATES PATENTS 3,042,227    7/1962    Tantlinger _____ 214—15

GERALD M. FORLENZA, Primary Examiner

F. E. WERNER, Assistant Examiner

U.S. Cl. X.R.

212—14